Figure 3:
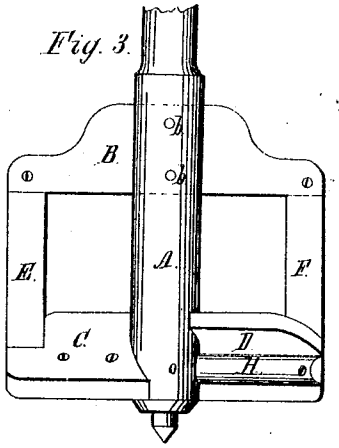
Figure 5:
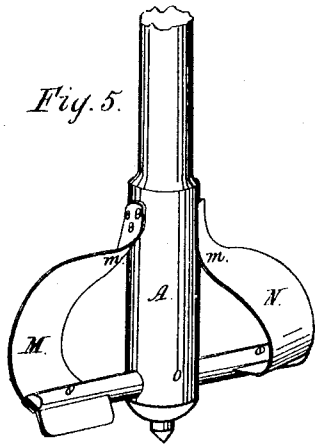
Figure 2:
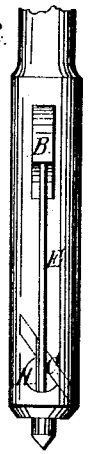
Figure 4:
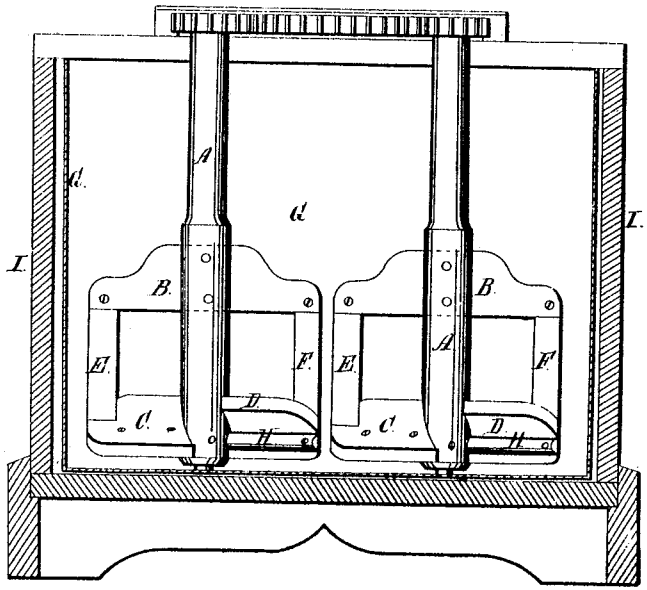
Figure 1:
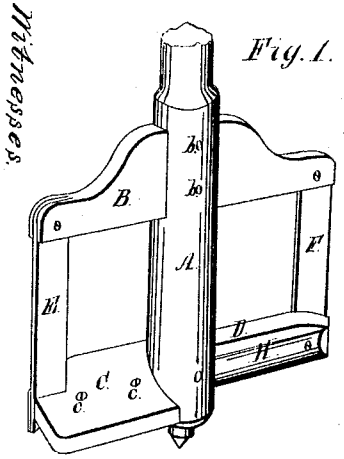

3-297 SP
28308 OR AI 293

M. L. Bauder.

Churn.

R1 No. 293. A.I. Patented Aug. 7, 1860.

297

Witnesses.

W. H. Burnidge
Henry Roth

Inventor.

M. L. Bauder

N. PETERS, PHOTO-LITHOGRAPHER, WASHINGTON, D. C.